United States Patent [19]

Petrie

[11] 3,863,613

[45] Feb. 4, 1975

[54] INTERNAL COMBUSTION ENGINE

[76] Inventor: Frank J. Petrie, 93b Beaver Terrace Cir., Framingham, Mass. 01701

[22] Filed: July 16, 1973

[21] Appl. No.: 379,235

[52] U.S. Cl. ............. 123/75 R, 123/75 B, 123/76
[51] Int. Cl. .................... F02b 21/00, F02b 33/44
[58] Field of Search ........ 123/53 A, 75 R, 75 B, 76, 123/75 RC, 26, 191 SP

[56] References Cited
UNITED STATES PATENTS

| | | | |
|---|---|---|---|
| 3,182,645 | 5/1965 | Wilson | 123/75 X |
| 3,650,261 | 3/1972 | Hutsell | 123/26 X |

FOREIGN PATENTS OR APPLICATIONS

| | | | |
|---|---|---|---|
| 1,187,255 | 11/1957 | France | 123/53 A |
| 801,861 | 2/1936 | France | 123/53 A |
| 903,454 | 11/1963 | Italy | 123/26 |

Primary Examiner—Charles J. Myhre
Assistant Examiner—W. Rutledge, Jr.
Attorney, Agent, or Firm—John E. Toupal

[57] ABSTRACT

Disclosed is an internal combustion engine including a primary cylinder that slidably retains a primary piston and defines a primary combustion chamber. An auxiliary combustion chamber is coupled to the primary combustion chamber by a coupling passage. An air supply piston is slidably retained in an air supply cylinder that defines an air supply chamber. A crank shaft couples the pistons and insures that they move synchronously and a valve, at preselected times during the operational cycle of the engine, couples the air supply chamber and the auxiliary combustion chamber for supplying extra air for complete combustion and for scavenging the following combustion.

5 Claims, 1 Drawing Figure

PATENTED FEB 4 1975     3,863,613
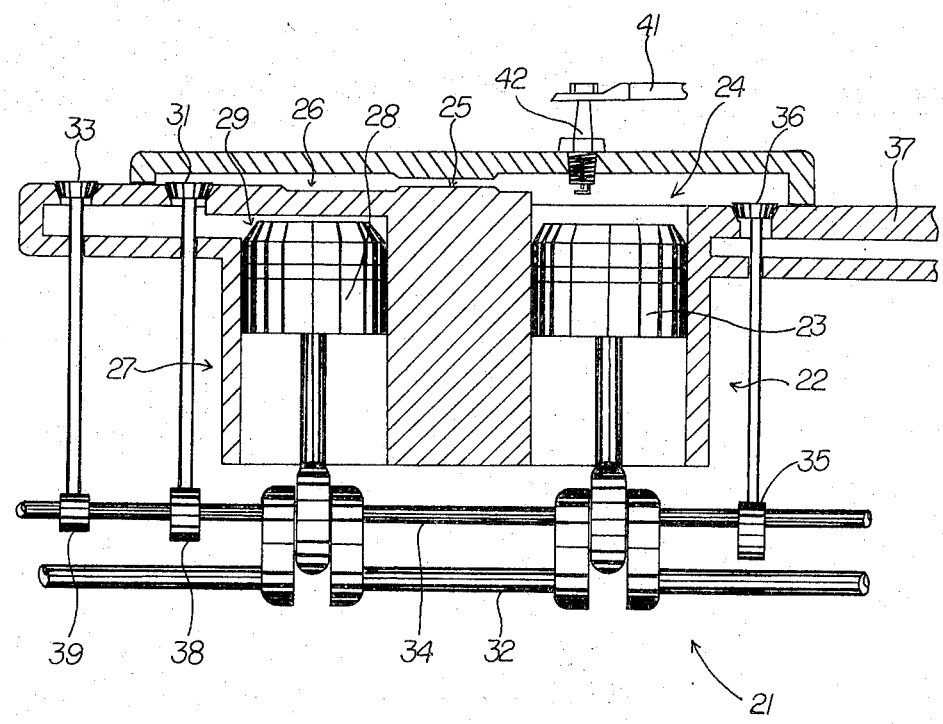

INTERNAL COMBUSTION ENGINE

BACKGROUND OF THE INVENTION

This invention relates to internal combustion engines and, more particularly, to apparatus for improving the efficiency of such engines.

The internal combustion engine has for many years been the workhorse of surface transportation power sources. However, today, much emphasis is being placed on an examination of the relatively low efficiency of the internal combustion engine as an energy converter. The reason for this emphasis is two fold. First, it is realized that this inefficiency is in part due to the incomplete combustion of fuels. The combustible gases that are expelled into the atmosphere are now realized to be a major contributor to air pollution. Second, the world as a whole, and the United States in particular, is now facing what is termed an energy crisis. It is felt that this, in large part, is due to unwise and inefficient utilization of our energy resources. Consequently, there is a great deal of interest in improving the efficiency of internal combustion engines, both to permit a decrease in gasoline consumption and to alleviate air pollution problems.

It is an object of this invention, therefore, to provide an internal combustion engine with substantially lower polluting emissions, a high rate of thermal efficiency and a low rate of fuel consumption per power unit produced.

SUMMARY OF THE INVENTION

This invention is characterized by an internal combustion engine comprising a primary cylinder that slidably retains a primary piston and defines a primary combustion chamber. An auxiliary combustion chamber, preferably of a fixed size, is in fluid communication with the primary combustion chamber. An air supply cylinder slidably retains an air supply piston and defines an air supply chamber. A common crank shaft insures that the pistons move synchronously and a coupling valve couples the air supply chamber to the auxiliary combustion chamber at preselected periods during the operation of the engine. The engine is preferably a four cycle engine and an ignition system provides ignition substantially concurrently with the termination of the compression stroke. In a conventional engine, rapid combustion causes a momentary extremely high pressure in the combustion chamber and a great mechanical strain on the engine. At times "knock" can result. Much of the energy released by this rapid combustion is wasted as heat is transferred to the engine itself and as physical deformation of the engine components occurs. Such rapid combustion in the present engine, however, causes a flow of gases from the primary combustion chamber to the auxiliary combustion chamber and thus relieves the instantaneous high pressure in the primary combustion chamber. Energy is stored as potential energy in the highly compressed gases in the auxiliary compression chamber and the gases flow back to the primary combustion chamber during the power stroke of the engine. Thus, a more even pressure is exerted on the primary piston during its entire power stroke than is possible in the absence of the auxiliary combustion chamber.

Preferably, during the intake stroke of the primary piston, an air inlet valve coupled to the air supply chamber opens and thus the air supply chamber draws in a measured amount of cool clean air. During the compression stroke of the primary piston, the coupling valve opens and the air that was previously drawn into the air supply cylinder is forced, under pressure, into the auxiliary combusion chamber. This improves the efficiency of the engine further than was described above inasmuch as a substantial portion of the hot gases forced into the auxiliary combustion chamber during ignition will be unburned or partially burned. Many of these gases would remain combustible but for the availability of further air supply in the auxiliary combustion chamber. Consequently, still greater engine efficiency will be realized.

Furthermore, the air supply cylinder preferably receives a measured amount of cool clean air during the power stroke of the primary piston. The coupling valve then opens during the exhaust stroke and the air within the air supply chamber is forced through the auxiliary combustion chamber, through the primary combustion chamber and out an exhaust valve thus providing very efficient scavenging. Thus so much of the inefficiency of conventional internal combustion engines as results from poor scavenging that leaves a substantial portion of burned gases in the combustion chamber is prevented.

It will be realized that the auxiliary combustion chamber coupled with the air supply chamber provides valuable improvement in internal combustion engines even if only part of the operation described above is used. For example, improvement will result if the air supply cylinder is used only for scavenging. Improvement will also result if air supply cylinder is used only for supplying the auxiliary combustion chamber with an improved air supply.

It has been found that utilizing two cylinders of substantially the same size provides good efficiency. However, it must be realized that as fuels and speed requirements change, it may be advantageous to alter the relative cylinder sizes. Furthermore, inasmuch as the high heat due to the instantaneous high pressure in conventional engines is not found in the subject engine, there is less internal heating. Consequently, it becomes possible to use pistons of a larger size than heretofore possible. For example, the diameter of pistons in gasoline internal combustion engines of the subject type may be six inches or larger.

DESCRIPTION OF THE DRAWING

These and other features and objects of this invention will become more apparent upon a perusal of the following description taken in conjunction with the accompanying drawing which shows a cross sectional view of a subject internal combustion engine.

DESCRIPTION OF THE PREFERRED EMBODIMENTS

Referring to the Figure there is shown a sectional diagram of an internal combustion engine 21 including a primary cylinder 22 slidably retaining a primary piston 23 and defining a primary combustion chamber 24. A small passage 25 provides fluid communications between the primary combustion chamber 24 and an auxiliary combustion chamber 26. An air supply cylinder 27 slidably retains an air supply piston 28 and defines an air supply chamber 29 that is coupled to the auxiliary combustion chamber 26 by a coupling valve 31. A common crankshaft 32 couples the pistons 23 and 28 so that they move synchronously. An air inlet valve 33 periodically opens to provide an air supply to the air supply chamber 29.

A camshaft 34 is coupled to the crankshaft 32 by conventional means (not shown) so that the camshaft makes one revolution for each two revolutions of the crankshaft. The engine 21 is preferably a four cycle engine. An exhaust lobe 35 opens an exhaust valve 36 during the conventional exhaust stroke of the primary piston 23 to permit the passage of hot gases into an exhaust pipe 37. A double lobed cam 38 opens the coupling valve twice during each revolution of the camshaft 34. The coupling valve 31 is opened during the exhaust stroke and the compression stroke of the primary piston 23. A second doubled lobe cam 39 opens the inlet valve 33 twice during each revolution of the camshaft, but cam 39 is offset from the cam 38 by 90°. Thus, the inlet valve 33 is open during the intake stroke and during the power stroke of the primary piston 23.

An ignition line 41 is coupled to a spark plug 42 to provide ignition of fuel substantially coincidentally with the end of the compression stroke. An intake valve (not shown) responds to the camshaft 34 to supply an air and fuel mix to the primary cylinder 22 during the intake stroke in the conventional manner.

During operation of the engines 21, the intake valve opens during the intake stroke to supply fuel to the primary combustion chamber 24 and the inlet valve 33 opens to supply cool clean air to the air supply chamber 29. During the compression stroke, the valve 33 closes and the coupling valve 31 opens and the cool clean air is driven, under pressure, into the auxiliary combustion chamber 26. At the end of the compression stroke, the coupling valve 31 is closed and the spark plug 42 is fired. Ignition causes a less severe instantaneous pressure rise in the primary combustion chamber 24 than is considered normal because much of the burning gas is forced through the passageway 25 into the auxiliary combustion chamber 26. Thus, the pressure in the auxiliary combustion chamber 26 rises, and, inasmuch as there is a plentiful air supply in the auxiliary combustion chamber, the gases are completely burned. As the power stroke continues gases flow from the auxiliary combustion chamber to the primary combustion chamber to insure a long smooth power stroke. Also, during the power stroke, the inlet valve 33 opens and the auxiliary air supply chamber 29 receives a supply of cool clean air. During the exhaust stroke the exhaust valve 36 opens. Thus, hot gases are forced from the primary combustion chamber 24 into the exhaust pipe 37 in the conventional manner. Furthermore, the coupling valve 31 opens and the air supply in the air supply chamber 29 is forced through the auxiliary combustion chamber 26, the passage 25 and the primary combustion chamber 24. Therefore, effective scavenging is provided. It will be appreciated that the coupling valve 31, the auxiliary combustion chamber 26, the coupling passage 25, the primary combustion chamber 24 and the exhaust valve 36 are in a generally linear configuration. These components need not be in a linear array. However, it is found that improved scavenging results when they are so arranged.

Obviously, many modifications and variations of the present invention are possible in light of the above teachings. For example, if more power is desired, a greater number of cylinders, such as a pair of primary cylinders and a pair of air supply cylinders, can be provided. Or, one way of accomodating fuel of different octane ratings is to provide an auxiliary combustion chamber of a variable size. It is to be understood, therefore, that the invention can be practiced otherwise than as specifically described.

What is claimed is:

1. An internal combustion engine comprising:
   a primary cylinder slidably retaining a primary piston and defining a primary combustion chamber;
   an auxiliary combustion chamber;
   a coupling passage for providing fluid communication between said chambers;
   an air supply cylinder slidably retaining an air supply piston and defining an air supply chamber;
   air inlet means for selectively supplying air to said air supply chamber;
   crankshaft means for coupling said pistons and causing them to move synchronously;
   valve means providing fluid communication between said air supply chamber and said auxiliary combustion chamber;
   valve control means for operating said valve means in a preselected cycle during the operation of said engine, said valve control means comprising a valve timing means for opening said valve means to provide fluid communication between said air supply chamber and said auxiliary combustion chamber during every other stroke of said primary piston; and
   exhaust valve means for exhausting hot gases from said primary combustion chamber, said primary combustion chamber being disposed in a fluid flow path between said auxiliary combustion chamber and said exhaust valve whereby gases discharged from said auxiliary chamber flow through and thereby purge said primary chamber before being exhausted through said exhaust valve.

2. An internal combustion engine according to claim 1 wherein said auxiliary comustion chamber is of a fixed size.

3. An internal combustion engine according to claim 2 wherein both of said pistons are of substantially the same size.

4. An internal combustion engine according to claim 2 wherein said primary piston is larger than six inches in diameter.

5. An internal combustion engine according to claim 2 comprising ignition means for causing ignition in said primary combustion chamber substantially at the end of the compression stroke.

* * * * *